United States Patent
Borchers et al.

(10) Patent No.: US 7,451,652 B2
(45) Date of Patent: Nov. 18, 2008

(54) INTERRUPTED DC OPERATION OF THERMOCOUPLE VACUUM GAUGE

(75) Inventors: John Borchers, Allentown, PA (US); Gary Ash, Dartmouth, MA (US); Paul Nickelsberg, Concord, MA (US)

(73) Assignees: Sumitomo Heavy Industries, Ltd., Tokyo (JP); Shi-Apd Cryogenics, Inc., Allentown, PA (US)

( * ) Notice: Subject to any disclaimer, the term of this patent is extended or adjusted under 35 U.S.C. 154(b) by 0 days.

(21) Appl. No.: 11/635,372

(22) Filed: Dec. 7, 2006

(65) Prior Publication Data

US 2007/0193283 A1    Aug. 23, 2007

Related U.S. Application Data

(60) Provisional application No. 60/754,431, filed on Dec. 28, 2005.

(51) Int. Cl.
*G01L 7/00* (2006.01)
(52) U.S. Cl. ....................................................... 73/700
(58) Field of Classification Search ................... 73/700; 62/55.5
See application file for complete search history.

(56) References Cited

U.S. PATENT DOCUMENTS

| | | | |
|---|---|---|---|
| 4,579,002 A | | 4/1986 | Zettler |
| 4,633,717 A | | 1/1987 | Scholl |
| 5,176,004 A | * | 1/1993 | Gaudet ........................ 62/55.5 |
| 5,351,551 A | | 10/1994 | Drubetsky et al. |
| 5,375,424 A | * | 12/1994 | Bartlett et al. ................ 62/55.5 |
| 5,517,823 A | * | 5/1996 | Andeen et al. ................ 62/55.5 |
| 6,022,195 A | * | 2/2000 | Gaudet et al. .................. 417/27 |
| 6,755,028 B2 | * | 6/2004 | Gaudet et al. ................ 62/55.5 |
| 7,155,919 B2 | * | 1/2007 | Gaudet et al. ................ 62/55.5 |
| 2004/0194477 A1 | * | 10/2004 | Gaudet et al. ................ 62/55.5 |

* cited by examiner

*Primary Examiner*—Andre J Allen
(74) *Attorney, Agent, or Firm*—Katten Muchin Rosenman LLP

(57) ABSTRACT

A direct current voltage to heat the sensor wire for powering and extracting a signal voltage from a thermocouple-type vacuum sensor. The direct current used produces a DC offset in the sensor output where the heating current flow is stopped for a short interval and the unbiased sensor voltage is then sampled and stored.

16 Claims, 3 Drawing Sheets

INTERRUPTED DC OPERATION OF THERMOCOUPLE VACUUM GAUGE

CROSS REFERENCE TO RELATED APPLICATION

This application claims the benefit of U.S. Provisional Application 60/754,431 filed on Dec. 28, 2005, the contents of which are herein incorporated by reference.

FIELD OF THE INVENTION

This invention relates to cryopumps, cryopump controllers and to pressure measurement during initial evacuation or regeneration of a cryopump. More particularly it relates to the use of a thermocouple vacuum gauge in a cryopump controller.

BACKGROUND OF THE INVENTION

Thermocouple vacuum gauges serve several functions in a cryopump controller, none of which requires a high degree of accuracy in the pressure measurement. The thermocouple is used during the evacuation of the cryopump from atmospheric pressure, either during an initial evacuation or when a cryopump is regenerated, to determine when to start the cryopump.

During evacuation the air is quickly removed from the cryopump but an extended period of time is typically required to remove water vapor that has been adsorbed on the cryopump walls and in the charcoal adsorbent that is typically used in the second stage cryopanel. In many systems, the cryopump is turned on when the thermocouple or other vacuum gauge reads a pressure of between about 0.1 and 0.2 torr. It is common practice to take readings of the rate of pressure rise before the pump is turned on to determine if the cryopump is "clean" or if there is a leak.

Once a cryopump is cold the pressure will be much lower than 0.001 torr and the thermocouple gauge gives a minimum reading. After a power interruption the pressure may rise above 0.001 torr. This eventuality may be included in the logic to decide if the cryopump should be restarted or put into a regeneration mode.

Thermocouples are commonly used temperature sensors as they are rugged, inexpensive and operate over a wide temperature range. Thermocouples are based on the Seebeck effect named after Thomas Seebeck, who discovered it in 1821 and which describes the voltage created whenever two dissimilar metals touch. The contact point produces a small temperature dependent open-circuit voltage [Seebeck voltage]. Although this voltage is nonlinear with respect to temperature at small enough temperature changes, the voltage is approximately linear according to the formula $\Delta V = S \Delta T$ where $\Delta V$ is the change in voltage, $S$ is the Seebeck coefficient, and $\Delta T$ is the change in temperature. However, due to the fact that S varies with changes in temperature, the output voltages of thermocouples are nonlinear over their operating ranges.

There are several different types of thermocouples, each typically designated by a letter that indicates the composition of the thermocouple according to American National Standards Institute (ANSI) conventions. For example, a J-type thermocouple has one iron conductor and one constantan (a copper-nickel alloy) conductor.

Thermocouple vacuum gauges are used to measure pressure in vacuum systems in the range of approximately 0.001 to 1 Torr. Below this pressure range the thermal conductivity of air is very small while above this range the thermal conductivity is essentially constant. Within this pressure range the thermal conductivity of air increases with increasing pressure and thus can be used to measure the pressure. Gases other than air have a similar characteristic but the pressure-conductivity relation may be somewhat higher or lower. A thermocouple vacuum gauge, [TC gauge] in its most basic configuration, operates by passing a current through a wire, e.g. a nickel wire, so that it gets hot. By connecting another wire of dissimilar metal, e.g. copper, to the center of the nickel wire where it is hottest, an EMF is generated at the ambient ends of the Ni and Cu wires due to the thermocouple effect (Seebeck effect). Assuming that a constant voltage is applied to the ends of the Ni wire then the EMF that is measured can be correlated to temperature, or, since the temperature is dependent on the pressure of the gas around it between about 0.001 and 1 Torr, the EMF can be correlated to pressure. Historically it has been most common to use AC voltage to heat the hot wire.

Zettler, U.S. Pat. No. 4,579,002 discloses a thermocouple vacuum gauge for measuring pressure in an evacuated enclosure. FIG. 1 of that patent shows a block diagram of the gauge. A time-multiplexed servomechanism 10 is used to supply a duration modulated constant amplitude heating pulse to thermocouple 12. In the intervals between heating, the EMF of the thermocouple is measured and compared to a reference voltage. The current needed to maintain the thermocouple at a constant temperature determines the duty cycle of the pulses. This duty cycle is a function of the pressure in the apparatus. Only one thermocouple is employed in this system. A linear response of temperature vs. pressure over approximately six orders of magnitude of pressure is possible with this configuration. A similar type of device is described in Scholl, U.S. Pat. No. 4,633,717.

The background section of Drubetsky, U.S. Pat. No. 5,351,551 has good descriptions of related prior art. The object of this patent is to extend the pressure range of the gauge above 1 Torr by using gas convection from a heated lower wire to an upper thermocouple.

Prior art TC use alternating current to obtain a signal voltage from the TC. It is an object of this invention to provide a simpler direct current voltage to heat the sensor wire.

SUMMARY OF THE INVENTION

A direct current voltage is used to heat the sensor wire for powering and extracting a signal voltage from a thermocouple-type vacuum sensor. A sensing thermocouple junction measures the wire temperature to determine the surrounding gas pressure. Because the direct current used for heating produces a DC offset in the sensor output, the heating current flow is stopped for a short interval and the unbiased sensor voltage is then be sampled and stored. This design eliminates the expense and complexity of providing high frequency alternating current excitation of the heated sensor wire.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
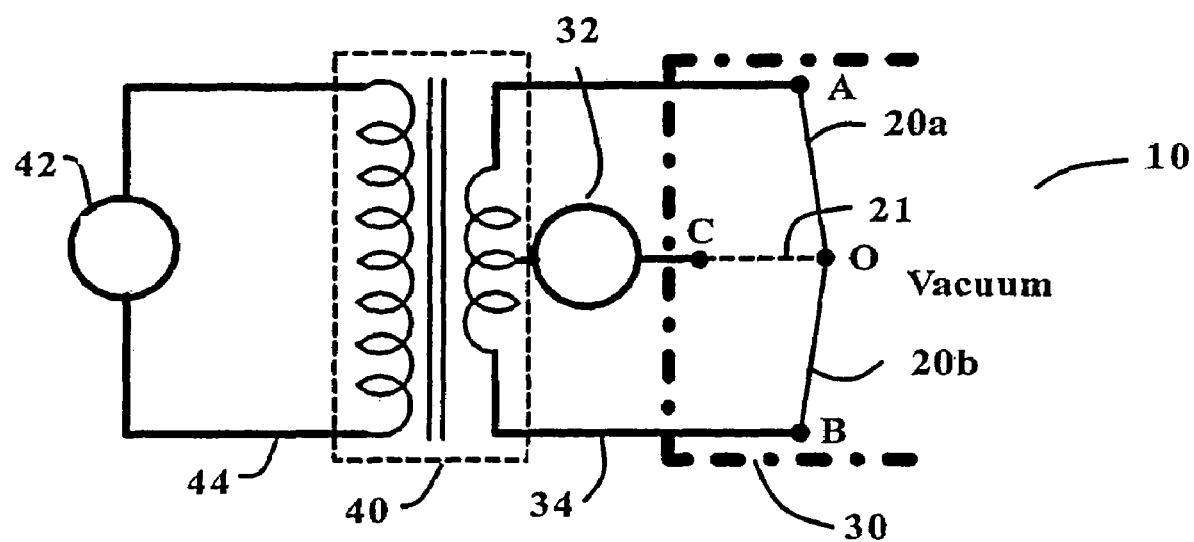
FIG. 1 is a schematic of a standard TC vacuum gauge with AC power.

FIG. 1 shows an assembly 10 that is comprised of AC power supply 42, transformer 40, gauge tube 30, and millivolt meter 32. Gauge tube 30, which is attached to a vacuum chamber, contains high impedance wire, 20a and 20b, that is connected to terminals A and B, and has junction O at its middle, to which dissimilar metallic wire 21 is attached at one end and to terminal C at the other end. Wire 20 may be constantan and wire 21 may be copper for example, thus junction O forms a pair of thermocouples between A and C, and B and C. A constant voltage is applied between junctions A and B causing wire 20a,b to get hot. For the gauge tube of this type made by Teledyne-Hastings Instruments, model DV-6M, a nominal voltage of 0.38 volts between A and B results in a maximum current of 0.021 amps to flow through wire 20 and a maximum temperature of about 300 C at O. The maximum temperature occurs when the pressure is less than 0.001 torr. Terminals A, B, and C are near room temperature. The thermocouple effect at this condition generates a reading on meter 32 of about 10 mV.

A primary voltage of 110-240 volts with a frequency in the range of 60 Hz to 2000 Hz in power supply 42 connected to transformer 40 in primary circuit 44 may be used with a center-tapped secondary to generate the 0.38 volts between A and B. The current may alternately be an alternating current of sinusoidal, square wave, or other form.

Figure 3:
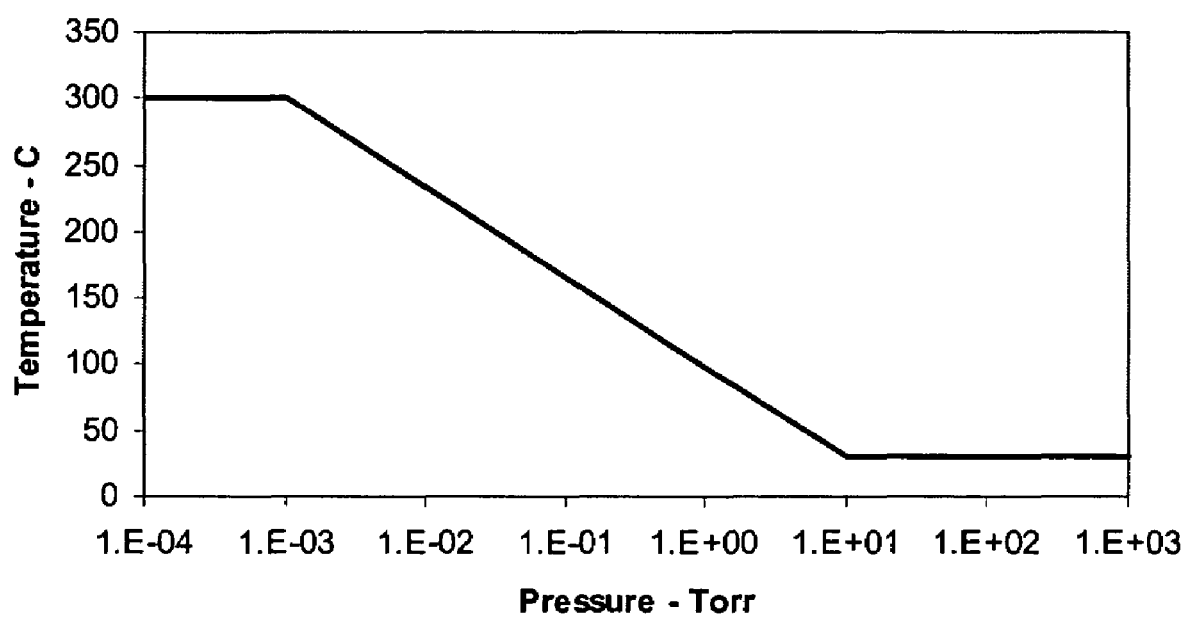
FIG. 3 is a diagram of the temperature of the hot wire in a TC vacuum gauge as a function of air pressure for a constant voltage across the hot wire.

At higher pressures, the thermal conductivity of the gas surrounding the thermocouple wires causes the temperature of the center point of the wire to be lower. The output of the thermocouple approaches zero volts at high pressure. At pressures above 1-5 torr, the thermal conductivity of most gases is nearly constant to atmospheric pressure (760 torr) and above, so the gauge is insensitive to these high pressures. Similarly, the gauge is insensitive to pressures below 0.001 torr because the thermal conductivity of most gases becomes vanishingly small. Thus, a thermocouple gauge is normally used in the pressure range of 0.001-1.0 torr, as shown in FIG. 3.

Normally, the thermocouple pairs are enclosed in small capsule 30 connected by a short tube to the vacuum chamber where the pressure measurement is to be made. The electrical leads from the thermocouples are taken out of the small enclosure by electrical feed-through pins. Millivolt meter 32, connected between the center tap of the transformer secondary and the thermocouple output terminal C indicates a voltage which is a non-linear indication of temperature and, hence, pressure. A table of values is used to convert the millivolt output to pressure. Although the thermal conductivity of gases varies between species, pressures are usually reported with respect to air or nitrogen.

Small differences between individual sensor tubes are calibrated out by adjusting the drive current to produce exactly 10 millivolt output under high vacuum conditions (P<0.001 torr) or through use of a reference gauge tube at a known, fixed pressure.

These devices were originally developed by the Hastings Instrument Company, now known as Teledyne Hastings. The circuitry shown is typical of what is contained in Hastings Model VH Vacuum Meter manufactured by Teledyne Instruments, a Teledyne Technologies Company, Hampton, Va. Further information regarding this instrument, incorporated herein and made a part hereof, may be obtained at the company's web site, http://www.hastings-inst.com/products/pv-vhseries.htm. Such sensor tubes and measurement circuits are made by many manufacturers as well.

Figure 2:
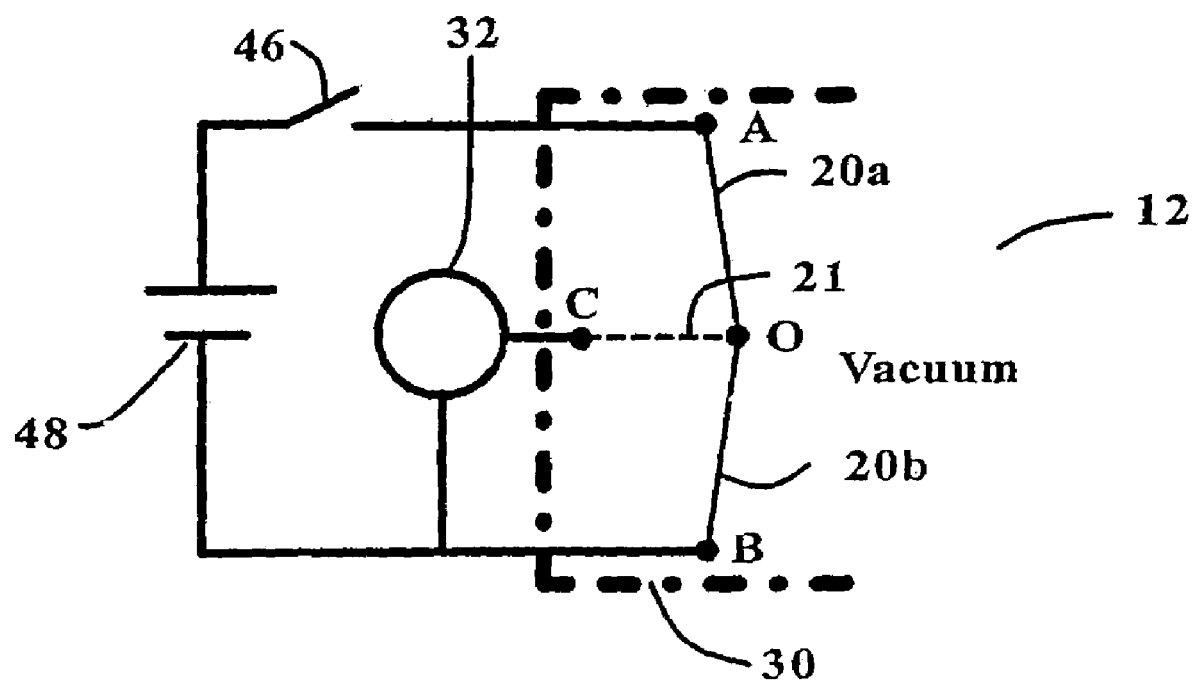
FIG. 2 is a schematic of the present invention showing a TC vacuum gauge with DC power and a switch to stop current flow while a reading is taken.

In the present invention, shown in FIG. 2, direct current from power supply 48 is used to heat hot wire 20a,b. However, the flow of direct current through wire 20 produces a small DC offset voltage with respect to the thermocouple output as measured by meter 32. This would normally prevent obtaining a correct indication of pressure. However, the excitation circuit is provided with electronically controlled switch 46 that allows removing the excitation voltage. When the drive voltage is removed, the thermocouple output voltage may be obtained by a sample-and hold-circuit. Further, the sampled voltage may then be converted to a digital signal using a digital-to-analog conversion circuit for additional processing. The sampling and conversion process is represented by millivoltmeter 32.

For vacuum conditions in the range of 0.001-10 torr, the exponential cooling time for the thermocouple wires is on the order of hundreds of milliseconds to several seconds, depending on the pressure. Thus, it is necessary to measure or sample the output voltage within a short period of time, e.g. 5-10 milliseconds. When the time between the removal of excitation and measurement is a few milliseconds, the thermocouple DC out put is essentially the same as when it is powered and only a small error in pressure measurement occurs, within the range of desired accuracy. When the voltage sample has been taken, the DC excitation is restored to bring the temperature of the filament back to its quiescent state. This may take as long as 2 seconds under high vacuum conditions. As soon as the junction has reached stable temperature, a new sample may be obtained. In most vacuum systems, a measurement frequency of once every 5-10 seconds is often enough to track critical changes in pressure.

It is typical to "zero", a TC vacuum gauge at a pressure of less than 0.001 torr. The process of zeroing the gauge is to set voltage between A and B such that the thermocouple output is 10 mV. This is typically done by internal logic circuitry when initiated by the operator or other logic circuitry. The present invention is being used in a cryopump controller where the objective is to keep the circuit simple. The circuit has a manually adjustable potentiometer that is set to "zero" the gauge during an initial test. An equation is programmed in the controller software that converts an input mV reading to a pressure value. The output pressure value can be "zeroed" by changing a constant in the equation or by shifting the time when the mV reading is taken after opening switch 46.

What is claimed is:

1. A high vacuum cryopump system comprising:
    a direct current source controlled by an electronic controller; and
    a thermocouple vacuum gauge coupled to the direct current source to receive the direct current, the thermocouple vacuum gauge used to measure the pressure in the cryopump during operation and regeneration;
    where the direct current is interrupted before a thermocouple reading is taken.

2. A method of zeroing a vacuum gauge in a high vacuum cryopump system comprising an electronic controller employing direct current for operation of a thermocouple vacuum gauge used to measure a pressure in the cryopump during operation and regeneration where the thermocouple vacuum gauge uses direct current that is interrupted before a thermocouple reading is taken, when the pressure is less than 0.001 torr by one of:

changing a constant in an equation that relates the thermocouple reading to pressure, and shifting the time when the reading is taken after said direct current is interrupted.

3. An electronic controller for a high vacuum cryopump, comprising:
  an arrangement for providing a direct current to a thermocouple vacuum gauge; and
  an arrangement for interrupting the direct current provided to the thermocouple vacuum gauge;
  wherein the thermocouple vacuum gauge is configured to measure the pressure in the cryopump during operation and regeneration.

4. An apparatus for determining a pressure in a high vacuum cryopump system comprising:
  a thermocouple arranged in a gauge tube,
  a circuit configured to provide direct current to the thermocouple and interrupt the direct current to take a reading, and
  an output means to read the pressure of the system.

5. The apparatus of claim 4, wherein the output means comprises a volt meter adapted to read a voltage output from the thermocouple during an interruption of the direct current.

6. The apparatus of claim 4, wherein the output means comprises a sample and hold circuit.

7. The method of claim 2, further comprising setting a voltage between two ends of the thermocouple vacuum gauge at 10 mV.

8. The electronic controller of claim 3, further comprising a sample and hold circuit.

9. The electronic controller of claim 3, further comprising a digital-to-analog conversion circuit.

10. A method of measuring a vacuum in a high vacuum cryopump system, comprising:
  applying a direct current to a thermocouple arranged in the vacuum to raise a temperature of the thermocouple;
  interrupting the direct current; and
  reading a voltage output of the thermocouple while the direct current is interrupted.

11. The method of claim 10, further comprising changing a constant in an equation that relates the voltage output to pressure.

12. The method of claim 10, further comprising shifting a time when the reading is performed after the direct current is interrupted.

13. The method of claim 10, wherein the reading is performed within 10 milliseconds after the direct current is interrupted.

14. The method of claim 10, wherein the direct current is restored after the reading is performed.

15. The method of claim 10, wherein the interrupting and reading are performed repetitively every 5-10 seconds.

16. The method of claim 10, further comprising setting a voltage between two ends of the thermocouple at 10 mV.

* * * * *